United States Patent
Takada et al.

(10) Patent No.: US 7,480,981 B2
(45) Date of Patent: Jan. 27, 2009

(54) METHOD OF PRODUCING HARD DISK DRIVES OF REDUCED SIZE

(75) Inventors: Akio Takada, Singapore (SG); Ching Biing Yeo, Singapore (SG); Kanzo Okada, Singapore (SG); Shun Kayama, Singapore (SG)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 10/915,219

(22) Filed: Aug. 10, 2004

(65) Prior Publication Data
US 2005/0036234 A1 Feb. 17, 2005

(30) Foreign Application Priority Data
Aug. 12, 2003 (SG) .............................. 200304380-9

(51) Int. Cl.
*G11B 5/105* (2006.01)
(52) U.S. Cl. .............. 29/603.04; 29/603.02; 29/603.03; 29/596; 29/598; 360/98.07; 360/99.08; 310/40 MM
(58) Field of Classification Search .............. 29/603.03, 29/603.02, 603.04, 603.07, 827, 596, 598; 360/98.07, 99.08; 310/156.32, 40 MM
See application file for complete search history.

(56) References Cited

U.S. PATENT DOCUMENTS

| | | | | |
|---|---|---|---|---|
| 4,847,712 A | * | 7/1989 | Crapo | ..................... 360/99.08 |
| 4,958,098 A | * | 9/1990 | Sarraf | ..................... 310/156.32 |
| 6,169,354 B1 | | 1/2001 | Springer et al. | |
| 6,990,727 B1 | * | 1/2006 | Butler et al. | ............. 29/603.03 |

FOREIGN PATENT DOCUMENTS

| JP | 11-213534 | * | 8/1999 |
|---|---|---|---|
| WO | WO 95/15559 | | 6/1995 |

OTHER PUBLICATIONS

Son et al., "The Acoustic Noise Characteristics of HDD Due to the Structural Excitation of Spindle Motor", Asia-Pacific Magnetic Recording Conference 2000, Nov. 2000, pp. MP8-01 to MP8-02.*
Mourlas et al, "Exploring Polysilicon Micromotors for Data Storage Micro Disks", IEEE /MEMS 96 Proceedings—An Investigation of Micro Structures, Sensors, Actuators, Machines, and Systems, pp. 198-203, Feb. 1996.*
Patent Abstract of Japan; Publication No. JP 10285842; Publication Date Oct. 23, 1998.

* cited by examiner

*Primary Examiner*—A. Dexter Tugbang
(74) *Attorney, Agent, or Firm*—Frommer Lawrence & Haug LLP; William S. Frommer; Thomas F. Presson

(57) ABSTRACT

A method of producing hard disk drives of reduced size including using a one or more MEMS spindle motors, and one or more magnetic heads. Each spindle motor includes a rotor and a stator. The rotor carries a film of magnetic film, and a head is arranged to communicate data with the magnetic film. The rotors are formed by MEMS technology. Rotor elements are formed within a substrate 4, and the substrate is subsequently cut to simulate the rotor elements, and turn them into rotors.

4 Claims, 10 Drawing Sheets

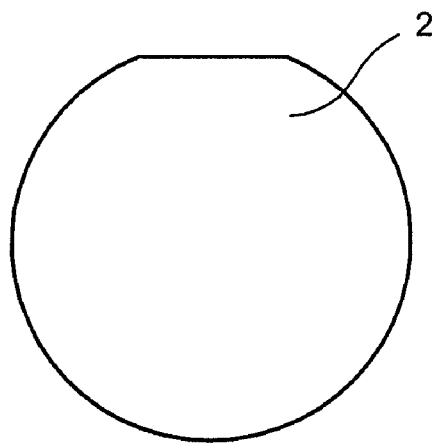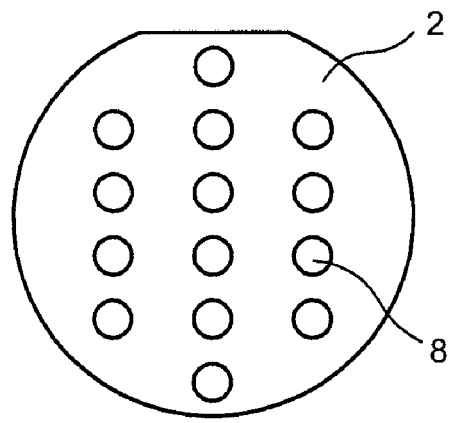
(a) (b)
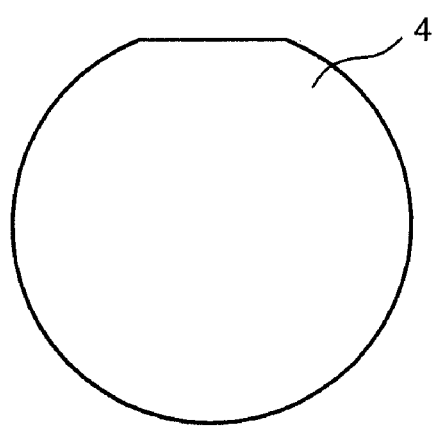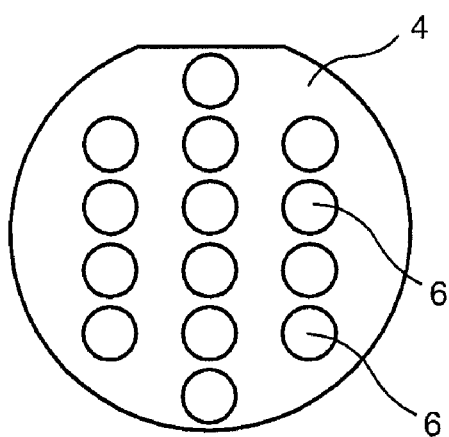
(c) (d)
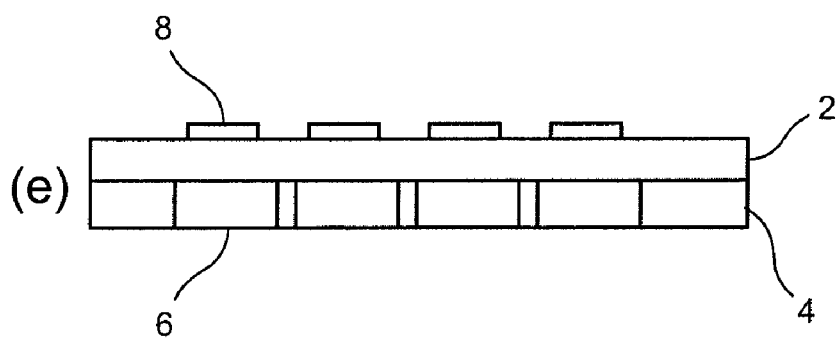
F I G. 1

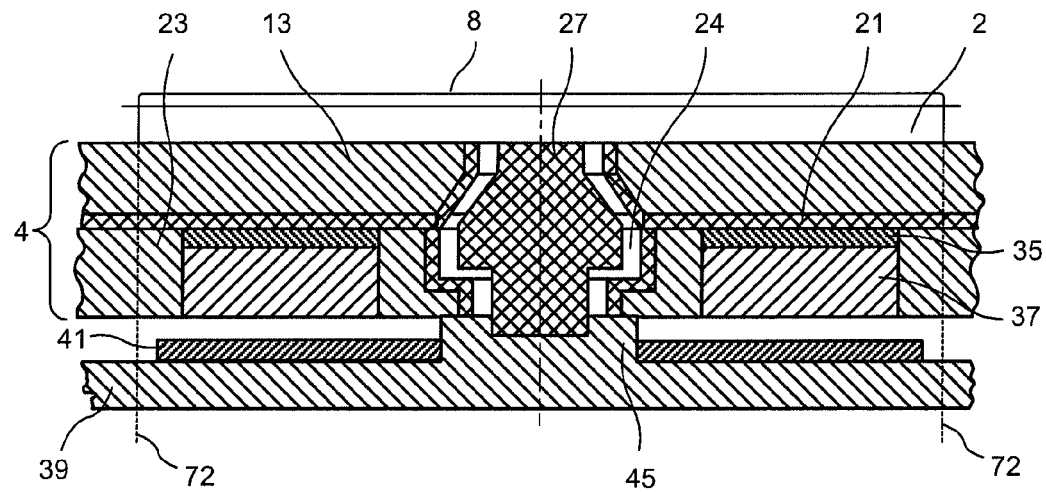
F I G. 9
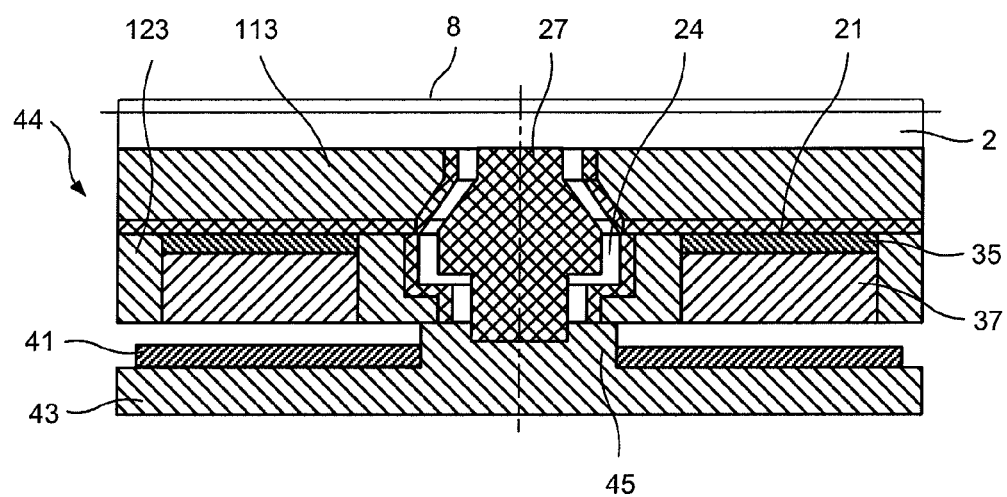
F I G. 10

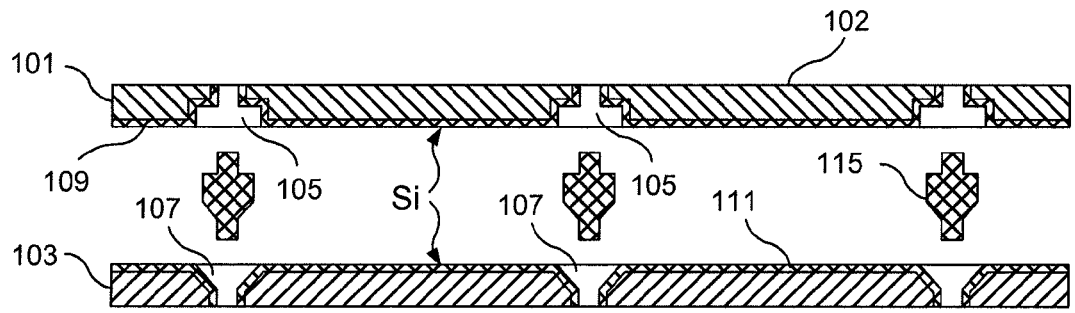
F I G. 11(a)
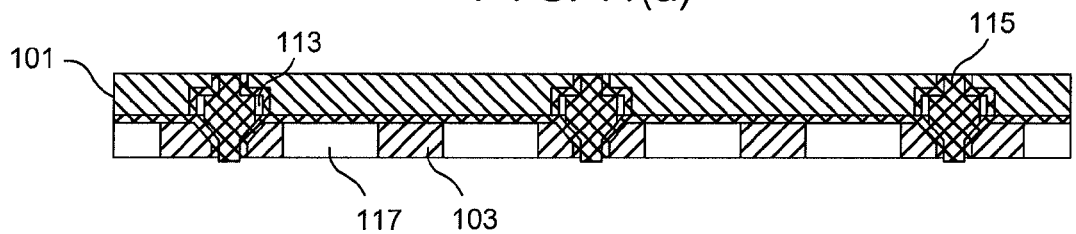
F I G. 11(b)
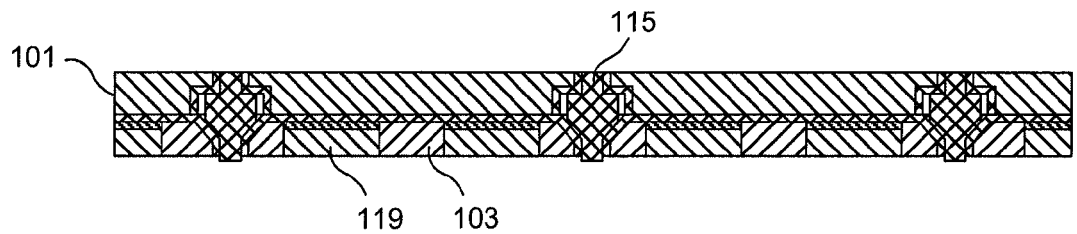
F I G. 11(c)
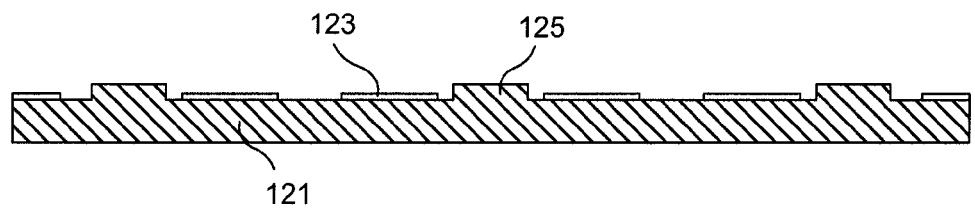
F I G. 11(d)
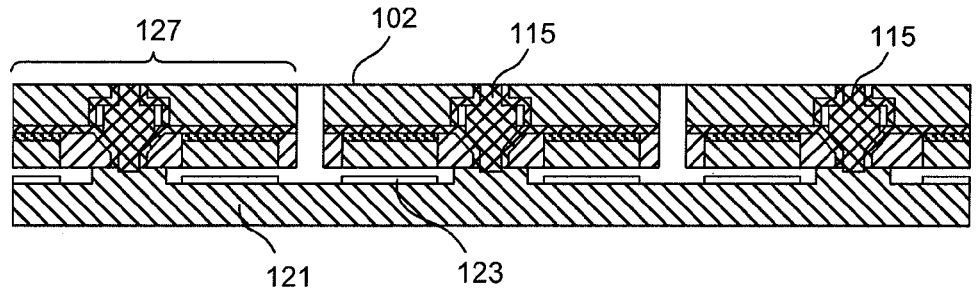
F I G. 11(e)

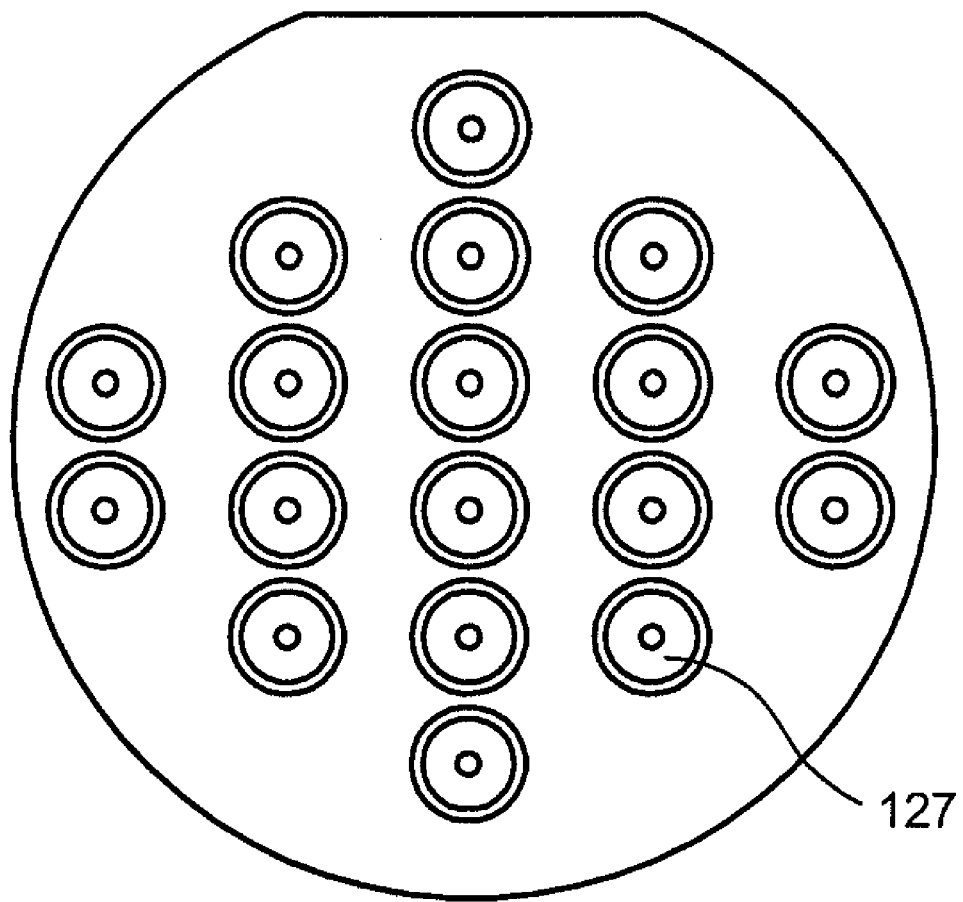
F I G. 11(f)

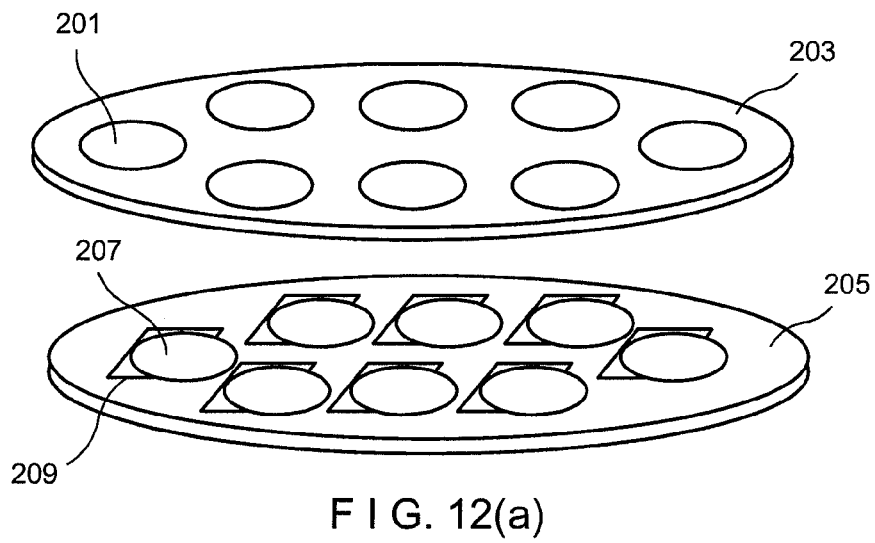
FIG. 12(a)
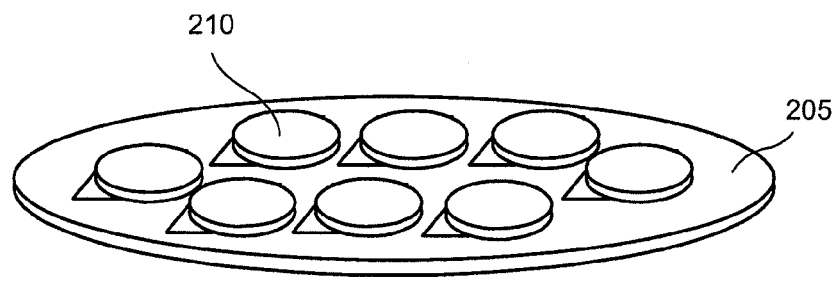
FIG. 12(b)
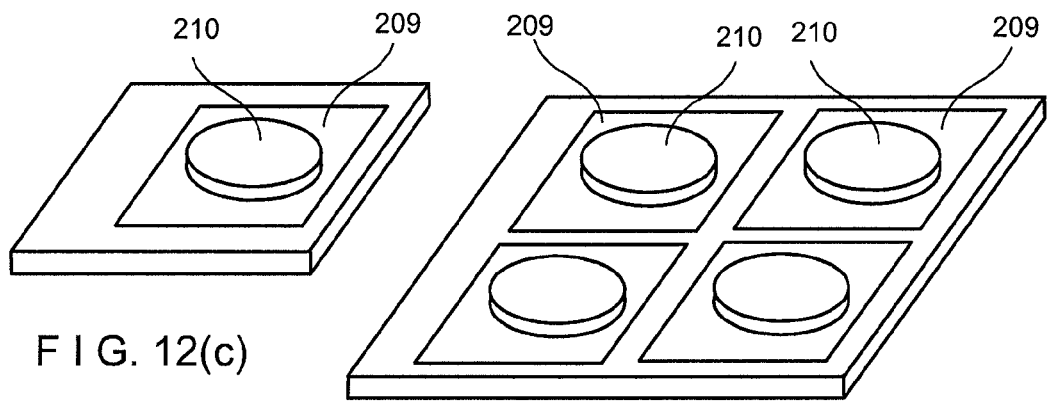
FIG. 12(c)
FIG. 12(d)

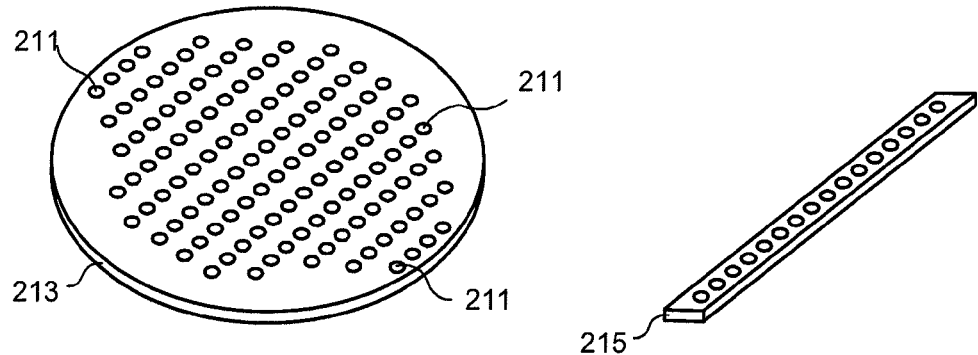
F I G. 13(a)
F I G. 13(b)
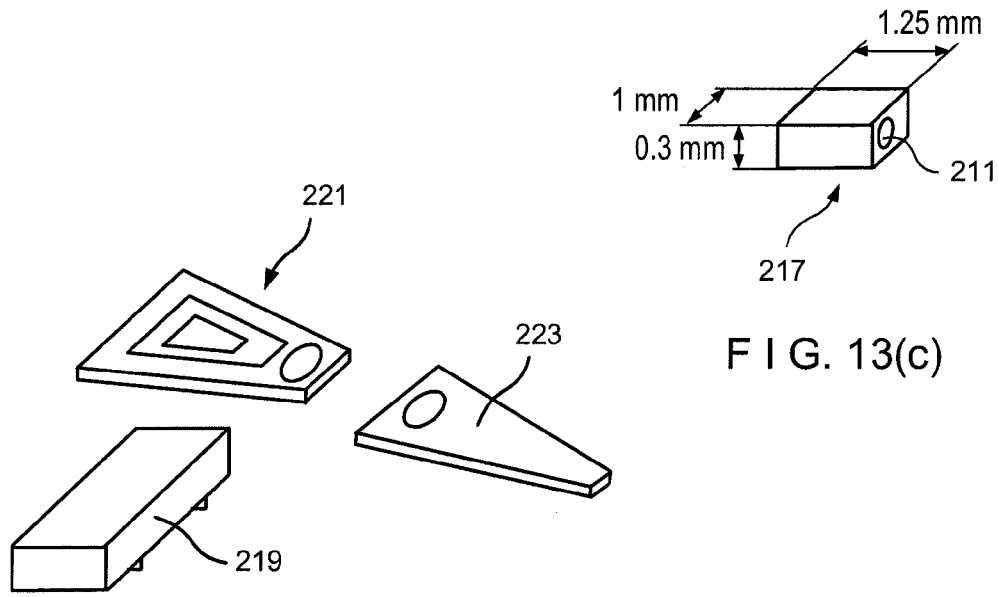
F I G. 13(c)
F I G. 13(d)
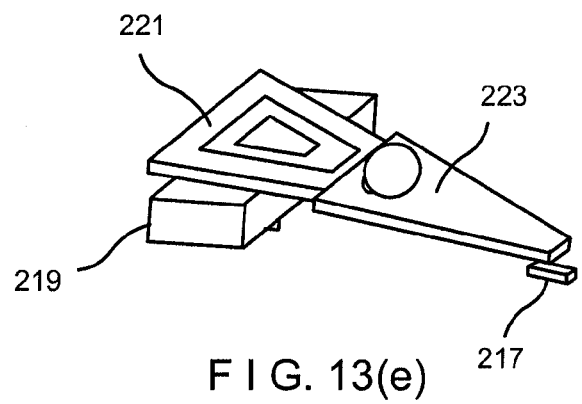
F I G. 13(e)

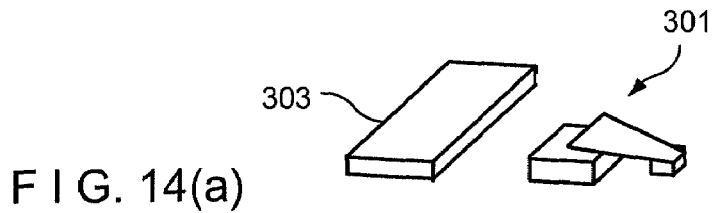
F I G. 14(a)
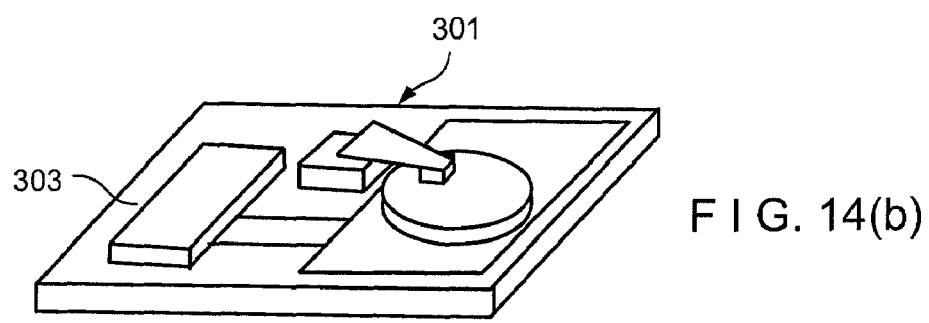
F I G. 14(b)
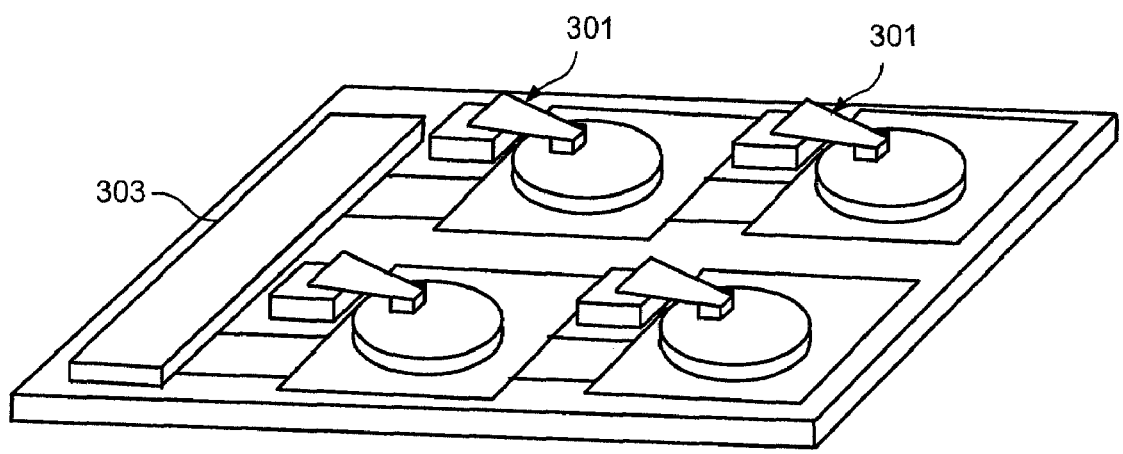
F I G. 14(c)
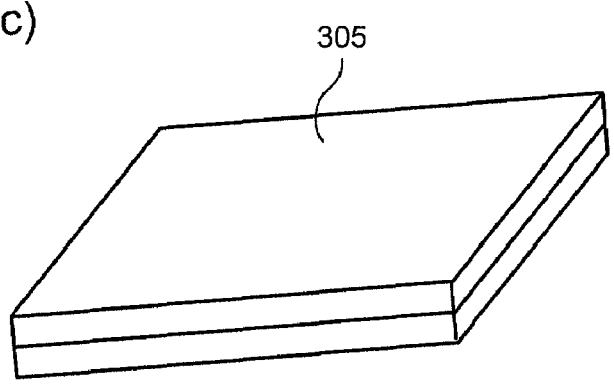
F I G. 14(d)

METHOD OF PRODUCING HARD DISK DRIVES OF REDUCED SIZE

FIELD OF THE INVENTION

The present invention relates to hard disk drives (HDDs), to methods for fabricating HDDs, and to portable electronic devices including HDDs.

BACKGROUND OF INVENTION

Most modern computers employ data storage systems including hard disk drives (HDDs)—that is systems in which an inflexible disk including magnetic material stores data which is written/read by a magnetic head which moves over the surface of the disk but does not come into physical contact with the disk. Hard disk drives provide high capability for storing information, and over the years, the data storage capacity of HDDs has been increased by several technological innovations, such as the use of GMR (Giant Magneto-Resistive) heads and fluid bearing type spindle motors. So far, however, the usage of HDDs has been restricted to storing information in computer systems, rather than in smaller items of consumer electronics. Recently, with increasing demand for portable consumer products, such as PDAs and cellular phones, there has been an increasing need for a small HDD, but it is difficult to produce small HDDs by applying conventional production methods such as precision machining and assembly techniques because there are difficulties in producing smaller parts and assembling them. For example, the spindle motor of an HDD basically consists of a stator and a rotor which carries magnetic disks. Both the stator and the rotor consist of several parts, such as a shaft, a magnet and coils.

In addition, the requirements for the mechanical performance of an HDD are highly demanding, because high reliability is required of a HDD system. Apart from high precision in the fabrication of the rotor and stator, precise mechanical control is required of other components too, such as the actuator which moves the head used for reading data from the magnetic disk.

SUMMARY OF THE INVENTION

The present invention aims to provide a new and useful HDD system.

In general terms, the present invention proposes an HDD system including a MEMS spindle motor including a rotor and a stator, the rotor carrying at least one film of magnetic film, and a head arranged to communicate data with the magnetic film.

Since the spindle motor is a MEMS device, the HDD system is smaller than a conventional HDD system. This makes the present HDD system very suitable for use in portable appliances such as PDAs and cellular phones.

Preferably the diameter of the rotor is less than 15 mm, and the total height of the spindle motor is less than 2 mm.

The rotors are produced by forming rotor elements within a substrate such as an Si substrate (for example by steps described in Singapore patent application 200207479-7 filed on 10 Dec. 2002, which was unpublished at priority date of the present application), and cutting the substrate around the circumference of the rotor elements to singulate the rotor elements, and turn them into individual rotors.

The rotor elements may be formed including a magnetic film before the substrate is cut, or may be attached to another substrate carrying the film so that the two substrates are cut together to form individual rotors.

The HDD element may comprise a plurality of rotors attached to a single stator element, which may itself be an Si substrate.

The system may be operable so that the plurality of rotors and corresponding heads perform as a RAID (redundant array of independent disks) system.

We have found that the embodiments of the present invention may be able to provide a recording density of over 31 gigabits/cm$^2$ (200 gigabits per square inch), when used with other HDD relates technologies which are emerging.

BRIEF DESCRIPTION OF THE FIGURES

Preferred features of the invention will now be described, for the sake of illustration only, with reference to the following figures in which:

FIG. 1, which is composed of FIGS. 1(a) to (e) shows the process steps of a first method for fabricating a rotor suitable for use in an embodiment of the invention;

FIG. 9 shows an operation of cutting the substrate formed by joining the substrates of FIG. 1;

FIG. 10 shows a spindle motor resulting from the cutting operation of FIG. 9;

FIG. 11 which is composed of FIGS. 11(a) to 11(f), shows the process steps of a second method for fabricating a rotor suitable for use in an embodiment of the invention;

FIG. 12, which is composed of FIGS. 12(a) to 12(d), shows the fabrication of a rotor-stator assembly from stators and from rotors produced by first or second rotor fabrication methods;

FIG. 13, which is composed of FIGS. 13(a) to 13(e) shows the fabrication of a head actuator suitable for use in an embodiment of the invention;

FIG. 14, which is composed of FIGS. 14(a) to 14(d), shows the assembly of a head actuator produced as shown in FIG. 13, with a rotor-stator assemblies produced as shown in FIG. 12(c) and FIG. 12(d), to form a hard disk drive which is an embodiment of the invention.

DETAILED DESCRIPTION OF THE EMBODIMENTS

Figure 2:
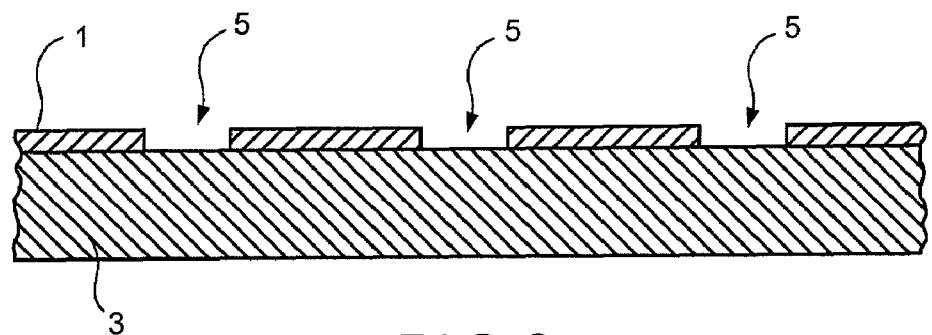
FIG. 2 is a cross-sectional view of a coated substrate formed in a first step of a method of forming rotor elements used in the process of FIG. 1.

Referring to FIG. 1, the steps are shown of a method which is an embodiment of the present invention, and which is for manufacturing a HDD which is itself an embodiment of the invention.

The method employs two Si substrates 2, 4 which are shown respectively in FIGS. 1(a) and 1(c), and are of a type commonly used in industry. A first Si substrate 2 is to be formed into magnetic disks, while the second Si substrate 4 is to be formed into MEMS rotors.

In a first step, the upper surface of the substrate 2 is coated with one or more layers, of the kinds used in to form the magnetic layers of known HDD devices. These layers include at least one magnetic film, and may optionally include other layers, such as a carbon overcoat.

The material deposited on the surface of the substrate 2 is then patterned. This can be done using known processes for forming MEMS devices, such a photo-lithography and etching. The result is shown in FIG. 1(b), having patterns 8 of magnetic material which will be come parts of the HDDs.

The Si substrate 4 is processed to form rotor elements 6 which are still attached to and part of the substrate 4 but which will subsequently be divided to form respective rotors.

The substrates 2 and 4 are then attached to each other with their respective surfaces against each other. This can be performed by a known wafer bonding technique such as anodic bonding or polymer bonding. For example, in the case of anodic bonding, the material Corning Pyrex 7740 may be deposited onto either one of the Si surfaces to be adhered, and then the two substrates placed with those surfaces against each other, followed by a step of applying a voltage between the substrates. In the case of polymer bonding, a polymer film such as CYTOP CTL-809M is deposited onto either one of the Si surfaces to be adhered, the two surfaces placed against each other, and then a known bonding process carried out.

Subsequently, the substrates 2, 4 are portioned along vertical lines to form individual motors. This is done by depositing a mask onto the upper surface of the substrate 2, and then applying a dry etching process.

There are many ways in which the formation of the rotor elements 6 can be performed. One of these ways is by a process described in Singapore patent application 200207479-7 filed on 10 Dec. 2002 (which was unpublished at priority date of the present application). This process is described below with reference to FIGS. 2 to 9. In fact, the method employs two Si substrates (i.e. instead of the single substrate 4 shown in FIG. 1). These substrates are respectively referred to as 13 and 23.

Figure 3:
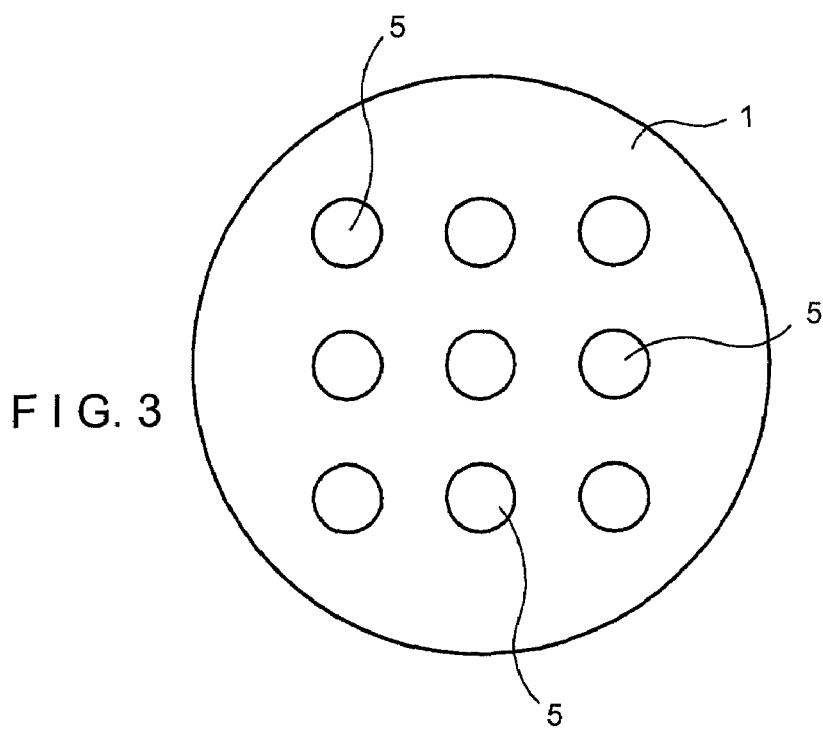
FIG. 3 is a top view of the coated substrate shown in FIG. 2.

The process step shown in FIG. 2 is carried out to each of them. Referring firstly to FIG. 2, a thin layer 1 of protective masking material is formed by spin-coating on the surface of a substrate 3. Multiple circular openings 5 are formed in the layer 1 by conventional lithography in an array. FIG. 3 is a top view of the coated substrate.

Figure 4:
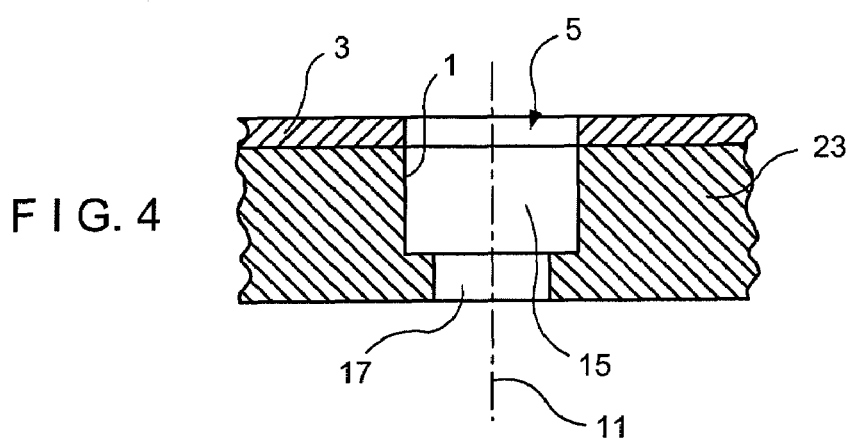
FIG. 4 shows in cross section a substrate which can be produced from the substrate of FIG. 2.

The coated substrate 13 or 23 is treated by dry plasma etching, in which etchant gas is released and used to form plasma ions which are accelerated by a high electrical potential toward the coated surface of the substrate 23, causing rapid corrosion. Since the ions travel straight towards the substrate, openings 15 with cylindrical walls 13 are formed through about half of the thickness of the substrate 13 or 23, as shown in FIG. 4.

By contrast the substrate 13 is provided a tapered profile for the openings 15 by plasma etching. This is done by forming the masking layer 1 (such as photo-resist) with a tapered cross-sectional profile, so as to be sloped at its end. This can be done, for example, by extended heat curing. In this case, the portion of the layer 1 having reduced thickness will provide less masking, and so permit a degree of etching of the substrate below it which is dependent upon the thickness of the masking layer 1. In other words, an opening would be produced with a degree of corrosion at any point which is related to the thickness of the masking layer at that point.

In each of the methods described above, the openings 15 are formed to extend through approximately half the thickness of the substrates. Following that, etching methods are employed on the opposite surfaces of the substrates (the lower surface as shown in FIG. 4) to produce cylindrical openings 17. Thus, through holes are formed in the substrates 3 as shown in FIGS. 4. The mask layer 1 is then removed.

Figure 5:
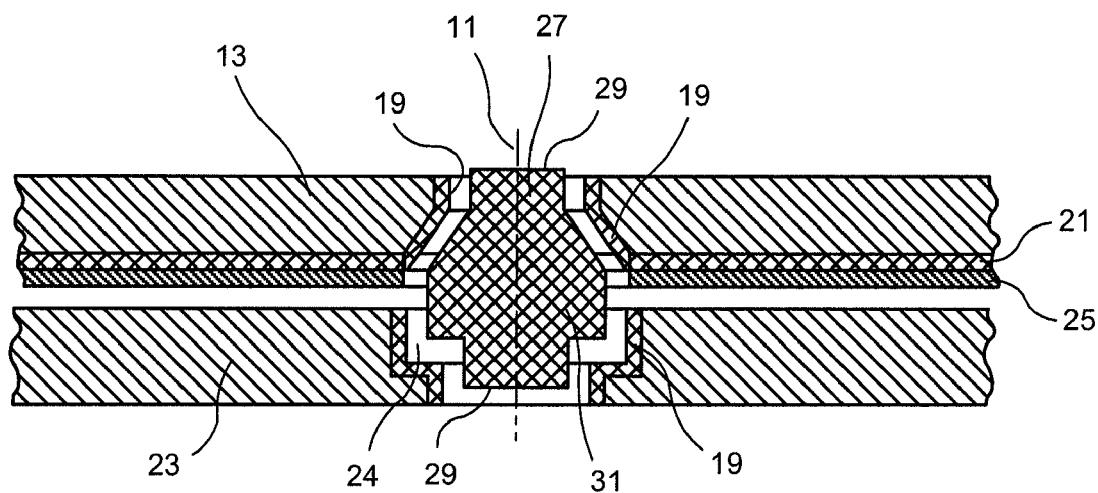
FIG. 5 shows the two substrates of FIG. 2 in an assembled configuration.

A coating film (labeled 19 in the FIG. 5) is then deposited on the interior surface of the openings 15, 17 on both of the substrates 13, 23 shown in FIG. 5. The layer 19 is formed from a material of which the friction coefficient is small such as diamond-like-carbon (DLC). As discussed later, the openings 15, 17 will subsequently be used to form a sleeve for the shaft of the stator, and in this case the film 19 provides a lubricating effect due to its low friction property. The film 19 can be formed by a deposition technique, such as a sputtering or chemical vaporization method. The required uniform film thickness can be achieved without complicated control techniques.

Following the deposition of the layer 19, a thin electrically conducting film 21 is deposited on the surface of the substrate 13 of the FIG. 5 which was formerly covered by the layer 1. The film 21 may be a Nickel-Iron (Ni—Fe) alloy, deposited on the substrate 13 by a vacuum process.

The substrates 13, 23 are positioned as shown in FIG. 5, with the openings 15 facing each other, so that they together define a chamber 24. A shaft 27 is positioned between the substrate 3. The shaft 27 is circularly symmetric about an axis which is made to coincide with the axis 11. The shaft 27 includes two relatively narrow portions 29 at each end, and a relatively wide portion 31 between them. The wide portion 31 is located within the chamber 24 formed between the substrates 13, 23. The shaft 27 may be fabricated from a hard rod, such as steel or titanium, by a conventional grinding process, and then preferably polished to achieve surface smoothness. Optionally, a DLC film of low friction coefficient is coated over essentially the entire outer surface of the shaft 27 to reduce friction at the contact surfaces of the shaft 27 which are to contact the contact surfaces of the substrates 13, 23. This DLC layer (not shown in FIG. 5) can be formed using a conventional deposition technique.

To precisely align the openings 15 a position microscopic alignment method is used, preferably using appropriate alignment markers. The substrates 13, 23 are then heated to cause fusion between them at their interface. Optionally, a thin Pyrex glass adhesion layer 25 may be provided on layer 21 of the substrate 13 to promote the fusion electrically. The details of a suitable bonding technique are available in several publications related to semiconductor fabrication processes, such as "Semiconductor wafer bonding: science and technology", Q. -Y. Tong and U. Gosele, John Wiley, 1999. As described there, a low-powered electrical voltage is typically applied between the substrates 13, 23 using a conductor probe, so that molecular attractions occur on the interface between the substrate 23 and the adhesion layer 25, thus bonding them together. Such a bonding process can be applied to substrates of various materials, and other adhesion layers 25, such as gold or polymer layers, may be used depending upon the process requirements. Note that the contact surfaces of the substrates 13, 23 and the layer 25 should be thoroughly cleansed or polished before the joining in order to provide a high quality article-free surface contact in order to give adhesion consistency.

Due to the electrically insulating DLC layer 19, the process of bonding the substrates 13, 23 to each other will not cause the shaft 27 to be attached to either of the substrates 13, 23, since no adhesion layer is formed on any of its surfaces. Hence, there is no additional step required to isolate the shaft 27 from the substrates 13, 23 during the bonding process. The adhesion only takes place at the interface between the substrates 13, 23, so that the shaft 27 is at all times free to rotate.

Note that once the substrates 13, 23 are bonded together, the wide portion 31 of the shaft 27 is permanently trapped inside the chamber 24 formed between the substrates 13, 23. FIG. 5 illustrates only a portion of the joined substrates 13, 23, and it is to be understood that the joined substrates 21, 23 comprise a plurality of chambers 24, each having a respective shaft 27 within it.

Figure 6:
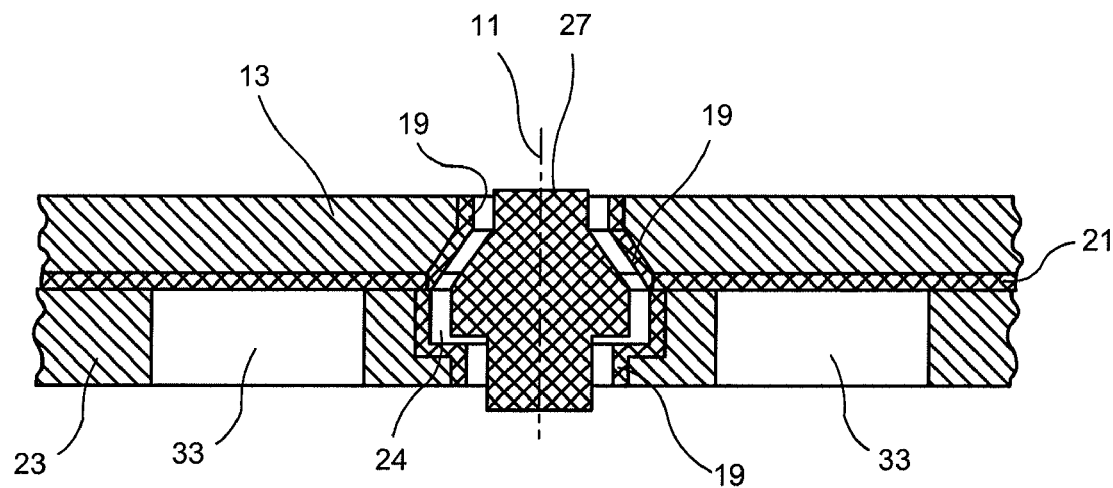
FIG. 6 shows the assembly of FIG. 5 after cavities have been formed in it.
Figure 7:
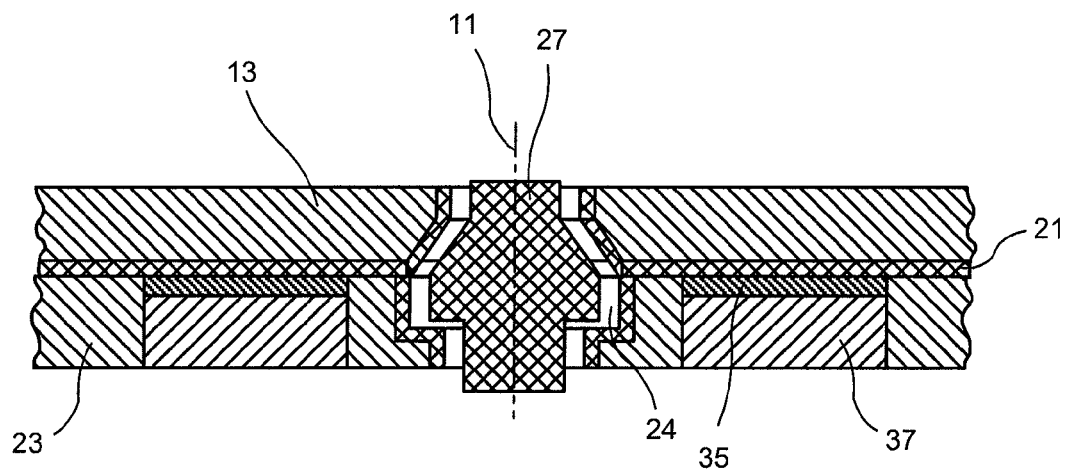
FIG. 7 shows the assembly of FIG. 6 with the addition of magnetic material.
Figure 8:
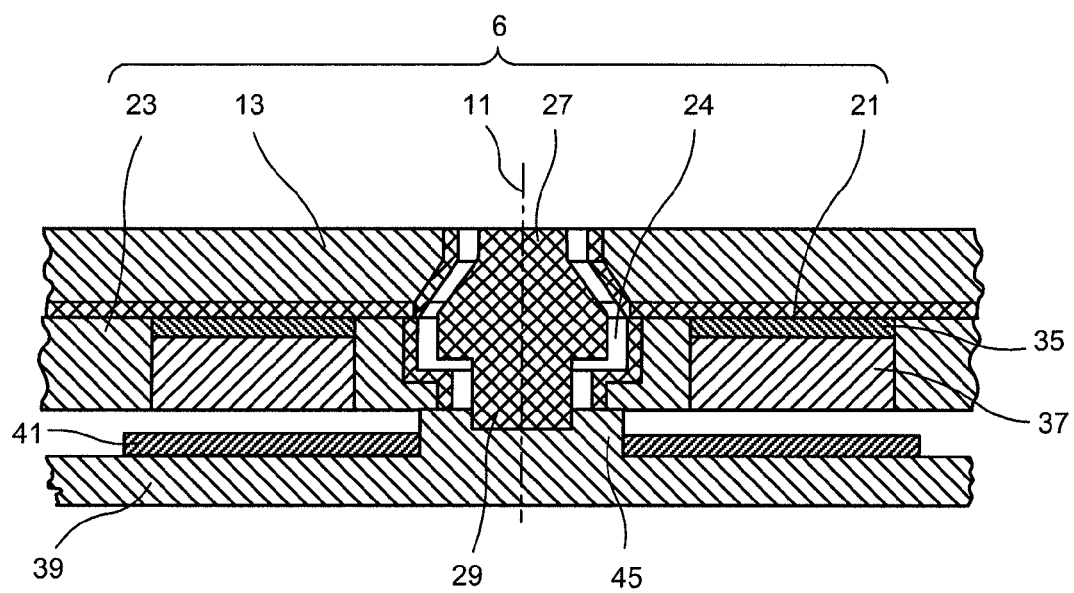
FIG. 8 shows the assembly of FIG. 7 after a stator has been connected to it.

In the next process step, as illustrated in FIG. 6, plasma etching is carried out to create circular cavities 33 extending throughout the entire thickness of the substrate 23 (i.e. about half of the total thickness of the combination of substrates 13, 23). The Ni—Fe seed layer 21 is then exposed in these cavities. The cavities 33 are formed by an etching process using a photo-resistant mark formed by lithography. This means that the cavities 33 have straight-walled trenches. By appropriate control of the speed, and velocity of the particles used in the etching process, the etch profile can be achieved precisely. The cavities 33 have a circular profile (as viewed from the side of the assembly which is lower most in FIG. 6) and there is one cavity per shaft encircling the shaft. FIG. 6 shows the two opposing sides of this cavity 33.

To intensify the induced electromagnetic force, a thin layer 35 of material with high magnetic saturation properties, such as Nickel-Iron (Ni—Fe) is coated onto the innermost surface of the cavities 33 using an appropriate electroplating technique. Such a method operates by applying electrical charges to draw metallic irons from a mixture solution containing the ingredients and using layer 21 as an electrode. The metal layer 35 shown in FIG. 7 functions as a yoke, which improves the magnetic flux linkage. The layer 35 is then covered by a magnetic material 37 which fills the cavities 33. Suitable materials 37 comprise Cobalt-based alloy (Co-P-X) which generates an intense magnetic field and has high resistance to de-magnetization. One suitable method for producing the layer 35 is electro-plating, which allows thickness of the layer 35 to be controlled uniformly and accurately. Once this deposition has been completed, the electrically conductive seed layer 21 is used to attract and accumulate metallic irons to fill the cavities 33, covering the yoke layer 35. Alternatively, a faster way of filling the cavities 33 is to use a screen-printing method to introduce a cream-like magnetic paste 37 into the cavities 33. The magnetic layers 35, 37 are then magnetized using external coils.

The shaft 27 is then attached to a substrate 39 which will later be divided into stators 43, each of which surround the axis 11 of a respective shaft 27. The structure of the substrate 39 is shown in cross section in FIG. 8. Mainly it is a uniformly thin Si substrate, but it includes circular raised portions 45 for each respective shaft 27. Each raised portion 45 is surrounded by copper windings 41 formed by a conventional plating process as a thin layer on the surface of the Si substrate. The copper windings 41 provide the electrical conductors for the induced driving force of a brush-less motor. The raised portions 45 are attached to the respective shafts 27. For this purpose, the contact surfaces of the shafts 27 which meet the raised portions 45 are coated with a thin adhesion layer, such as pyrex, by a vacuum deposition process in order to facilitate the bonding. Likewise, the previously mentioned electrical bonding method is again utilized by inserting the narrow ends 29 of the respective shafts 27 into respective etched circular depressions in the respective raised portions 45. In this position, the radially outermost section of the raised portion 45 contacts a portion of the substrate 23.

At this point the rotor elements 6 are completed. The combination of substrates 13, 23 forms the substrate 4 of FIG. 1. It is now joined to the substrate 2 by wafer bonding, to give the structure shown in FIG. 9. Thus, the substrates 2, 13, 23 are all joined together to give a single composite substrate.

The structure shown in FIG. 9 is then cut along the vertical lines 72, to transform the rotor elements 6 into rotors, each of which can rotate about a corresponding one of the shafts 23. This is shown in FIG. 10. Singapore patent application 200207947-7 further proposes that before the raised portion 45 of the stator 43 is attached to the respective shaft 27, a circular pattern of V-shaped grooves is formed in the lower surface of the rotor 44 surrounding the chamber 23 by a dry etching process. When the rotor 44 rotates, these grooves generate a positive air pressure on the under surface 49 of the rotor 44 near the raised portion 45 of the stator 43. This air pressure pushes the rotor 44 away from the stator 43 to prevent frictional contact between the raised portion 45 of the stator 43 and the rotor 44.

Additionally, an air flow is generated between the shaft 27 and the rotor 44. The air pressure above the conical surface of the shaft 27 pushes upwardly on the contact surface 9 of the rotor portion 13. This air pressure pushes the rotor 44 up, and thus helps to "float" the rotor above the stator surface.

Turning to FIG. 11, the steps of a method which is a second embodiment of the invention are shown. The method employs a substrate 101 which carries a magnetic film 102 which is suitable for data recording. The substrate 101 is used with a second Si substrate 103. As shown in FIG. 11(*a*), the two Si substrates 101, 103 are each shaped by a deep RIE (reactive ion etching) process to include respective sets of cavities 105, 107. Subsequently a DLC layer 109, 111 is formed on the substrates by implantation.

As shown in FIG. 11(*b*), the wafers 101, 103 are then bonded together by a wafer bonding step, so that pairs of the cavities 105, 107 form chambers 113, which each enclose a shaft 115, and cavities 117 are formed in the substrate 103 by plasma etching. The cavities 117 encircle the shafts 115. As shown in FIG. 11(*c*), circular magnets 119 are formed by electroplating, filling the cavities 117.

FIG. 11(*d*) shows a stator substrate 121, which, similarly to the substrate 39 described above, has thin film coils 123 formed on it, encircling raised portions 125.

As shown in FIG. 10(*e*), the raised portions 123 of the stator substrate 121 are joined to respective shafts 115.

At this point, the substrates 101, 103 are cut along lines which are vertical in FIG. 10(*e*) to isolate individual rotors 127, each comprising a respective shaft 115. The rotors 127 are circular as viewed from the direction along the shafts 115, which is how they are viewed in FIG. 11(*f*). The rotors 127 each carry a layer 102 of magnetic material on their top surfaces (i.e. their surfaces away from the stator substrate 121), since this was present on the top surface of the substrate 101. Thus, no separate substrate corresponding to the substrate 2 of the first embodiment is required.

The reason why Si substrates are preferred in the first and second embodiments of the invention is that their surface can be made to be very smooth, and smoothness required in order to be able to form a high performance from a magnetic film deposited on the surface of the Si in later steps of the embodiment. Furthermore, MEMS processes for Si such as etching and wafer bonding techniques have been developed in recent years and are well established; Thus Si is suitable for use in the embodiment both from the point of view of its suitability for MEMS processes and as a substrate for carrying a recording medium. However, the invention is not limited to Si substrates. For example, $SiO_2$ substrates are an alternative.

Turning to FIG. 12, methods of using the rotors produced by the first and second embodiments are shown. FIGS. 12(a) and 12(b) show schematically the final steps of the processes shown in FIG. 1 and FIG. 10.

As shown in FIG. 12(a), the rotors elements, shown as 201, are initially within a substrate 203. This moment corresponds to the step of first embodiment shown in FIG. 9, and of the second embodiment shown in FIG. 11(c). The shafts of the rotor elements 201 are then wafer bonded to a stator substrate shown as 205 in FIG. 12(b). The stator substrate has stator elements 207 (each comprising a respective coil), and additionally for each of the stators it includes extra circuitry shown as 209. This circuitry may include electrodes and wiring. Then, as shown in FIG. 12(b), the substrate 203 is cut to singulate the rotor elements 201 to form individual rotors 210 on the stator substrate 205.

FIGS. 12(c) and 12(d) show two different ways in which the substrate 203 can be divided into individual elements. In FIG. 12(c), this division is such that there is only a single rotor-stator combinations (i.e. a single spindle motor) in each element. In FIG. 12(d), this division is such that there are four rotor-stator combinations (i.e. four spindle motors) in each element. In each spindle motor the diameter of the rotor is preferably less than 15 mm, and the total height of the spindle motor is preferably less than 2 mm.

FIG. 13 shows the steps of fabricating the head actuators, which follows techniques already used in the HDD industry, but adapted to form elements of much reduced size, to suit the reduced size spindle motors described above. Additionally, due to their reduced size, the sliders have improved tribological performance and servo-control.

Firstly, as shown in FIG. 13(a) magnetic heads 211 are formed on a substrate 213. Then, as shown in FIG. 13(b), the substrate 213 is diced, so form bars 215 having a row of heads 211. These bars 215 are then further diced to form individual head elements 217, as shown in FIG. 13(c). The head element 217 is substantially cuboidal, such as so-called "pico-size" (with dimensions 1 mm, 1.25 mm and 0.3 mm). It includes a single head 211.

By a separate process, a head suspension assembly is produced as shown in FIG. 13(d). In comprises a magnet 219, a voice coil motor (VCM) 221, an a suspension 223.

As shown in FIG. 13(e), the head element 217 is attached to one of the head suspension assemblies.

Turning to FIG. 14, construction of HDDs using the elements produced above is shown. The electronics of the HDD is provided by the combination shown in FIG. 14(a): the head suspension assembly 301 of the kind shown in FIG. 13(e), and a driver integrated circuit 303.

FIG. 14(b) shows how one HDD system can be produced by combining the elements of FIG. 14(a) with the single spindle-motor element as shown in 12(c).

FIG. 14(c) shows how a HDD system having an array of HDDs can be produced by combining the elements of FIG. 14(a) with a four spindle-motor element as shown in FIG. 12(d).

In either case, the HDD system can be enclosed in a case 305 to give a completed HDD system. In addition the HDD system may include another integrated circuit for acting as an interface between the HDD system and an external microprocessor, through which the HDD system receives information to store in the magnetic material of the rotors, or through which the HDD outputs information retrieved from the magnetic material of the rotors. Moreover, if appropriate software is implemented in the integrated circuits of the HDD system, it can operate as a RAID (redundant array of independent disks) system, so as to give an HDD system with enhanced reliability. The implementation of this software will be straightforward to an expert in this field.

Although only a few embodiments of the method have been described in detail, many embodiments are possible within the scope of the invention as will be clear to a skilled reader. For example, clearly the embodiments having multiple spindle-motors are not limited to having four such elements as shown in FIG. 13(c), but there could be any number of such elements.

The invention claimed is:

1. A method of forming a Hard Disk Drive (HDD) Redundant Array of Independent Disks (RAID) system, the method comprising:
    forming a substrate including a plurality of rotor elements and at least one layer of magnetic material, the rotor elements being connected to respective stator elements;
    cutting the substrate to isolate the rotor elements to form corresponding MEMS rotors, each supporting at least one film of magnetic material;
    forming a circular pattern of V-shaped grooves in the MEMS rotors such that, upon rotation of the MEMS rotors, positive air pressure reduces frictional contact between the MEMS rotors and the stator; and
    providing magnetic heads for respective ones of the MEMS rotors, for communicating data with the magnetic material.

2. The method according to claim 1,
    wherein the substrate comprises:
    a first substrate portion; and
    a second substrate portion that are mutually attached, the first substrate portion supporting the magnetic material and the second substrate portion including the MEMS rotors.

3. The method according to claim 1,
    wherein more than one of the stator elements are part of the same stator substrate.

4. The method according to claim 3 in which, after the cutting step, the stator substrate is cut into elements each comprising a plurality of stator elements.

* * * * *